E. A. PALMER.
RESILIENT WHEEL.
APPLICATION FILED APR. 5, 1913.
1,120,156.
Patented Dec. 8, 1914.
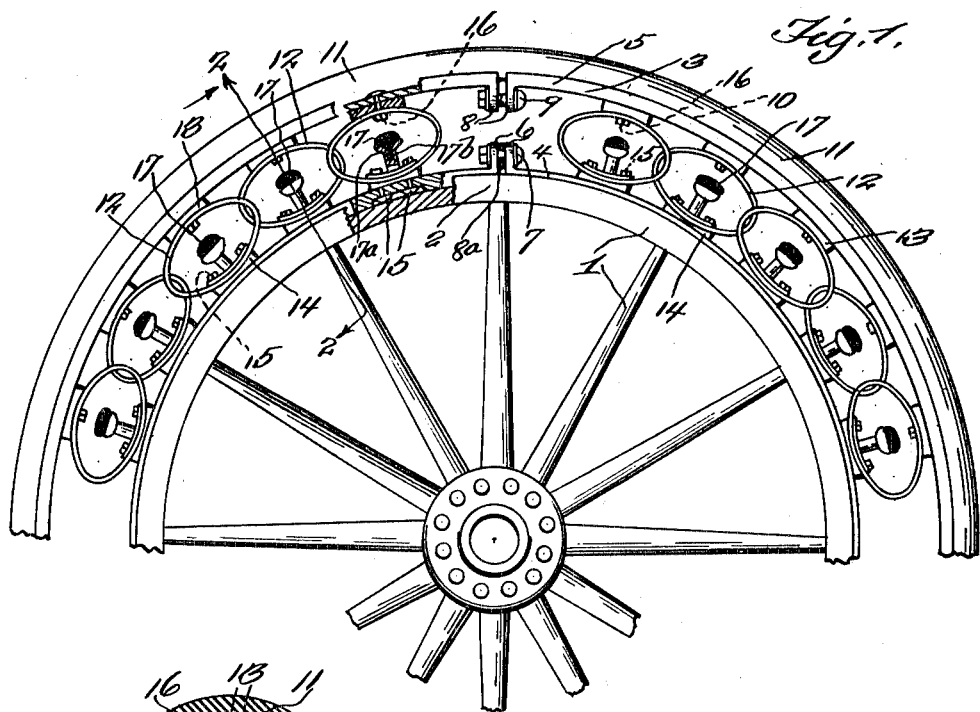
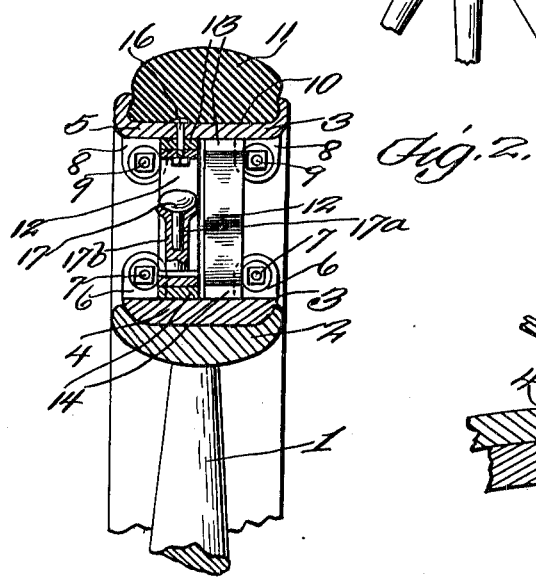
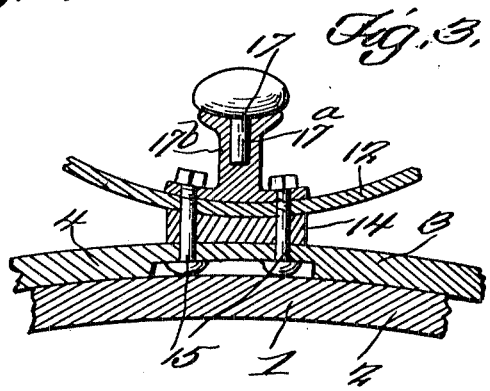
Witnesses
Inventor
E. A. Palmer,
By D. Swift & Co.
his Attorneys

UNITED STATES PATENT OFFICE.

EUGENE ALBERT PALMER, OF BELLE PLAINE, IOWA.

RESILIENT WHEEL.

1,120,156.  Specification of Letters Patent.  Patented Dec. 8, 1914.

Application filed April 5, 1913. Serial No. 759,069.

*To all whom it may concern:*

Be it known that I, EUGENE A. PALMER, a citizen of the United States, residing at Belle Plaine, in the county of Benton and State of Iowa, have invented a new and useful Resilient Wheel; and I do hereby declare the following to be a full, clear, and exact description of the invention, such as will enable others skilled in the art to which it appertains to make and use the same.

This invention relates to the art of resilient wheels, and particularly to resilient tire construction.

An object of the invention is the provision of a tire construction comprising an inner band to surround the rim of the ordinary automobile wheel, and an outer band or rim having a channel for the usual rubber tire, there being a series of elliptical springs interposed between said inner and outer rims.

Another object of the invention is to provide the adjacent ends with inwardly turned lugs, to receive bolts or the like whereby said rims or bands may be secured upon the wheel.

A feature of the invention is the provision of a series of bumper members, so constructed as to absorb the shock or jar on the outer rim of the tire, in passing over rough places.

Another feature of the invention is the idea of fastening the outer rim to the elliptical springs with only one bolt, which is disposed in alinement with the center between the two bolts, which secures the inner rim to said elliptical springs. This allows the outer rim to move farther from the inner rim at the top of the wheel when in motion, as well as affording more resiliency in rebounding or assuming its normal condition.

In practical fields the details of construction may necessitate alterations, to which the patentee is entitled, provided the alterations fall within the scope of what is claimed.

The invention comprises further features and combination of parts, as hereinafter set forth, shown in the drawings and claimed.

In the drawings:—Figure 1 is a view in side elevation and partly in section, of an automobile wheel equipped with the improved two rimmed resilient tire. Fig. 2 is a sectional view on line 2—2 of Fig. 1, showing the construction of the fiber buffer blocks and the bumper members. Fig. 3 is a detail view.

Referring more especially to the drawings, 1 designates the usual form of automobile wheel having the ordinary construction of rim 2, while 3 denotes the double rimmed resilient tire. This improved resilient tire comprises the inner and outer rims 4 and 5. The inner rim 4 surrounds the rim 2 of the wheel, and is seated in the channel of such rim 2, there being lugs 6 at the adjacent ends of the rim 4 for tightening the same in place, by means of the bolts 7. Interposed between the lug 6 is a strip of rubber, in order to give or yield as the rim 4 is tightened. The outer rim 5 also has its adjacent ends terminating in lugs 8, to receive bolts 9, whereby said rim 5 (which is constructed with a channel 10 for the reception of the ordinary rubber tire 11) may be clamped in position. Interposed between the rims 4 and 5 is a series of annularly arranged elliptical springs 12, between which and the inner and outer rims 4 and 5 fiber buffer blocks are positioned, designated by the characters 13 and 14. The inner portion of each elliptical spring is secured to the inner rim 4 by the bolts 15, which also secure the fiber buffer block 14 in place. The outer portion of each elliptical spring is secured to the outer rim 5 by a single bolt 16, which is arranged centrally of the bolts 15. The provision of the bolts 15 and 16, and particularly their arrangement, allows the outer rim to spring farther from the inner rim at the top of the wheel when in action, thereby affording more resiliency when the outer rim rebounds to its normal position and condition.

The inner rim is provided with a series of bumper members 17, to absorb the shock and jar of the outer rim as the wheel passes over rough places. Said bumper members 17 comprise the bumper or cushion portions proper, which may be constructed of rubber of a resilient nature having the stems or lug portions 17$^a$, which are constructed of hard rubber, received in the sockets of the lugs 17$^b$. These lugs 17$^b$ are provided with plates, which are bolted to the rim 4, by means of the bolts 15. The outer ends of the lugs 17$^b$ are provided with annular flanges forming cup shaped portions, on which the resilient bumper members engage. When the outer rim 5 is depressed, the heads or nuts of the bolt 16 contact with the bumper members, thereby absorbing the shock and jar of the outer rim.

The invention having been set forth, what is claimed as new and useful is:—

1. A resilient tire comprising inner and outer rims, the inner rim having undercut recesses, bolts carried by the inner rim with their heads in said recesses, buffer blocks on the inner rim through which said bolts extend, a multiplicity of elliptical springs arranged in sequence and alternately overlapping each other, one elongated side of each spring receiving every two of said bolts which are provided with nuts, said buffer blocks having opposite concave surfaces to fit the contour between the inner rim and said springs, buffer blocks, each having an outer convex surface to fit the inner surface of the outer rim, and an inner concaved surface to correspondingly fit the outer convexity of each elliptical spring, means for fastening the outer rim and its buffer blocks to the outer portions of said elliptical springs, and a plurality of bumper members carried by the inner portions of said elliptical springs with which the fastening means of the outer portion of the springs contact.

2. A resilient tire comprising inner and outer rims, the inner rim having undercut recesses, bolts carried by the inner rim with their heads in said recesses, buffer blocks on the inner rim through which said bolts extend, a multiplicity of elliptical springs arranged in sequence and alternately overlapping each other, one elongated side of each spring receiving every two of said bolts which are provided with nuts, said buffer blocks having opposite concave surfaces to fit the contour between the inner rim and said springs, buffer blocks, each having an outer convex surface to fit the inner surface of the outer rim, and an inner concaved surface to correspondingly fit the outer convexity of each elliptical spring, means for fastening the outer rim and its buffer blocks to the outer portions of said elliptical springs, a plurality of bumper holders secured to the inner portions of said springs by said bolts and nuts having sockets and cup-shaped portions, and bumpers in said cup-shaped portions and having lugs engaging said sockets, and with which bumpers said fastening means of the outer portions of said springs contact.

In testimony whereof I have signed my name to this specification in the presence of two subscribing witnesses.

EUGENE ALBERT PALMER.

Witnesses:
S. E. OLIVER,
Ross R. BAILEY.